Figure 1:
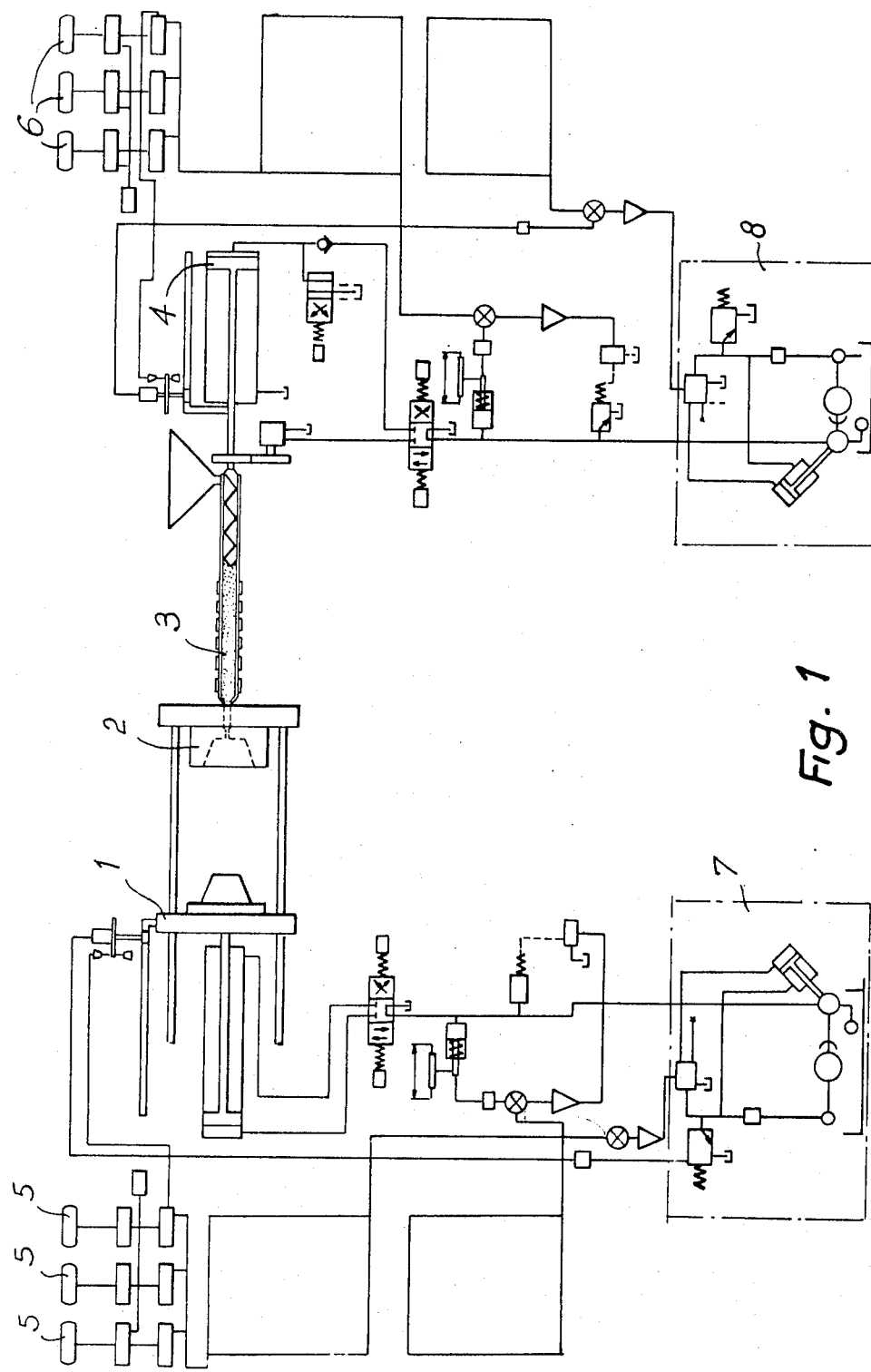

United States Patent [19]

Muzsnay

[11] 3,857,658

[45] Dec. 31, 1974

[54] APPARATUS FOR INJECTOR MOLDING

[75] Inventor: Laszlo Muzsnay, Amiens, France

[73] Assignee: Societe anonyme dite: Plastimonde, Paris, France

[22] Filed: May 25, 1973

[21] Appl. No.: 364,059

Related U.S. Application Data

[63] Continuation of Ser. No. 82,495, Oct. 20, 1970, abandoned, Continuation of Ser. No. 748,530, July 19, 1968, abandoned.

[30] Foreign Application Priority Data

Aug. 3, 1967  France ............................ 67.116752
July 10, 1968  France ............................ 68.158661

[52] U.S. Cl. ............... 425/145, 425/150, 425/162, 425/166, 425/450

[51] Int. Cl. ............................................. B29f 1/04

[58] Field of Search .......... 425/135, 242, 138, 145, 425/150, 162, 168, 165, 166, DIG. 223, 450

[56]  References Cited
  UNITED STATES PATENTS 3,178,497  4/1965  Moscicki ...................... 425/247 X
3,339,240  9/1967  Corbett ............................ 425/130
3,359,601  12/1967  Evans ........................... 425/251 X
3,440,932  4/1969  Ctutnikov et al. ................. 91/435
3,481,001  12/1969  Stillhard ........................... 425/168
3,616,495  11/1971  Lemelson ....................... 425/162 X
3,767,339  10/1973  Hunkar ............................ 425/145

Primary Examiner—Francis S. Husar
Assistant Examiner—David B. Smith
Attorney, Agent, or Firm—Fitzpatrick, Cella, Harper & Scinto

[57]                ABSTRACT

An apparatus for injection moulding in plastics materials wherein the displacements of the movable part of the mould and at least one injection piston are controlled by the pressure of a fluid delivered by at least one pump and wherein during a portion of the injection cycle the fluid pressure is varied by means which is controlled by the velocity of displacement of the movable part.

1 Claim, 10 Drawing Figures

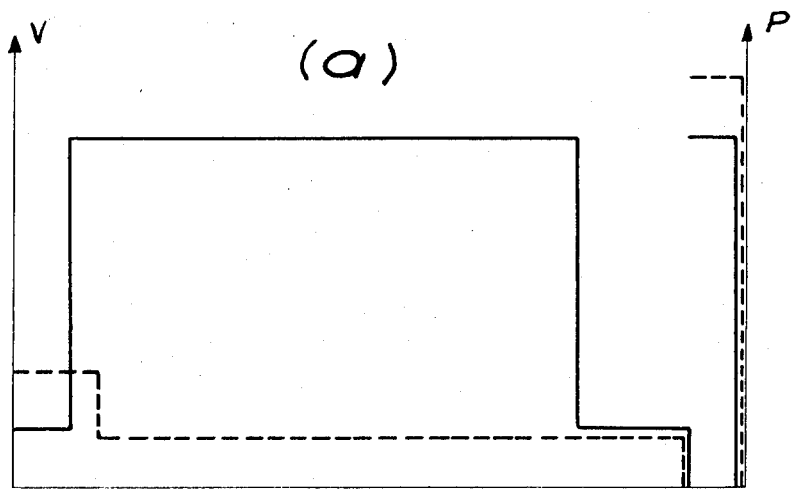
Fig. 4
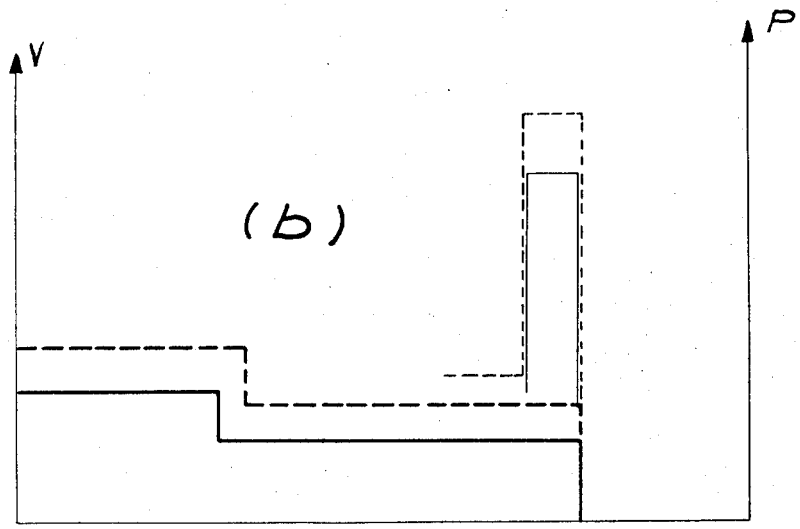

APPARATUS FOR INJECTOR MOLDING

This is a continuation of application Ser. No. 82,495, filed Oct. 20, 1970, now abandoned, in turn a continuation of Ser. No. 748,530 filed July 19, 1968, now abandoned.

This present invention relates to an improved process of moulding of plastics materials, using a more flexible and more precise control of the system of regulation of the displacements of the mould and of the injection piston.

In modern injection moulding presses, displacement of the movable part of the mould on the one hand and of the injection piston on the other hand are ensured by means of the pressure of a fluid supplied by a volumetric type of pump, co-operating with constrictions or throttle members and discharge valves. It is possible to ensure, by means of regulation of the pressure of fluid, that a given programme of opening and closure of the mould and injection of the plastics material is followed through. This system has numerous disadvantages however, because the movable part of the mould on the one hand and the injection screw on the other hand are subject to the pressure effects of the fluid without there necessarily being a precise relation between the displacement of the movable parts and the pressure acting upon them. This results in certain difficulties in precise regulation of the moulding cycles and marked irregularities from one cycle to another, because of fortuitous or systematic variations in the hydraulic circuits or in the properties at the time being of the material to be injected. Moreover, the expenditure of energy is considerable and is badly utilised. The power absorbed by the pump is the product of its output and the pressure. It is continuously available at the volumetric pump and, in case of need, requires return of the excess of oil under pressure to the supply reservoir, which constitutes a considerable loss of energy. The present invention provides means for very effectively overcoming these various disadvantages. It is characterised in that the effective output of the pump or pumps which, through the intermediary of a fluid, displacements of the movable part of the mould and of the injection piston, is regulated at all times, for any position of the part the displacement of which is to be controlled, at a predetermined velocity by velocity/displacement programmes which are previously determined, both for the movement of the press or of the mould and also for displacement of the injection piston.

Thus, the displacement and the velocity of displacement of the movable platform of the press are followed and converted into electrical signals, the displacement in the form of square-wave electrical pulses and the velocity by the potential of the electro-motive force produced by an accompanying tachometer operating at a velocity proportional to the velocity of displacement. This can be carried out, for example, by means of a rack integral with the movable platform, which effects rotation of a toothed wheel which, in turn, causes movement of a sectored masking disc and of a dynamo. A photo-electric cell and a source of light suitably disposed on adjacent parts of the masking device provide pulses which produce the desired masking movements, in the manner of an optical encoder.

Other devices for detection of the displacement and of the velocity are also applicable, such as the magnetic rule for displacements and for velocities, electro-magnetic transducers which provide a continuous current having a potential proportional to the velocity.

A decimal counter (four tens suffice to appreciate to one-tenth mm displacements of up to 1 metre) receives the pulses and continuously indicates the further displacement which requires to be effected up to closure. The zero reference position clearly is that position of the movable platform in the locked position. A time-base is also introduced into the counter, which allows extraction from the counter of the number of pulses per unit time and gives the numerical value of the velocity at any instant during the cycle. However, to avoid response times which are not negligible, it is preferable to measure the velocity by means of a tachometer and this signal controls regulation of the velocity.

The velocity/displacement programmes and pressure/displacement graphs on X Y co-ordinates can be converted into numerical language by means of programmation matrices of the omnibus bar type or cross-bar type.

It is thus possible in certain selected positions of the part of which the displacement is to be controlled (the screw) to make the velocities or pressures correspond which it is desired to impose upon it, for continuation of the displacement. Potentials proportional to programmed velocities (or pressures) are transmitted from the control circuits to the comparator.

These control circuits are of a well-known kind known as the closed-looped servo-control type. The comparator receives the reference signal and the response signal emitted by the meter which control execution of the order and provides a current proportional to the difference between the two signals, at a constant gain amplification which controls the receptor device. This modifies its position until the response signal is equal to the reference signal.

Also, the processes previously described likewise allow the action of a hydraulic pump to be related to the position of the injection piston.

However, it can also be advantageous when the movable platform of the press or the injection piston has attained certain critical positions, for the hydraulic pump or pumps to be no longer controlled by the displacement of the movable parts. It then is sufficient, at a suitable instant selected from the displacement/time programme, to reduce the pump to a low but stable output, and to regulate the return pressure as a function of time, which is the case particularly when the movable part of the mould reaches its end of stroke and when locking of the mould requires, for a substantially zero displacement, a considerable increase in pressure. This is also the case for the injection piston when, after a controlled displacement at constant velocity, it continues under the influence of the maximum pressure provided by the pump or when, at the end of stroke, it is solely necessary to ensure a complementary supply to the mould following shrinkage of the plastics material.

The combination of these two methods of control of the pump, which combination allows injection cycles to be employed of a novel character, also constitutes a feature of the invention.

Figure 3:
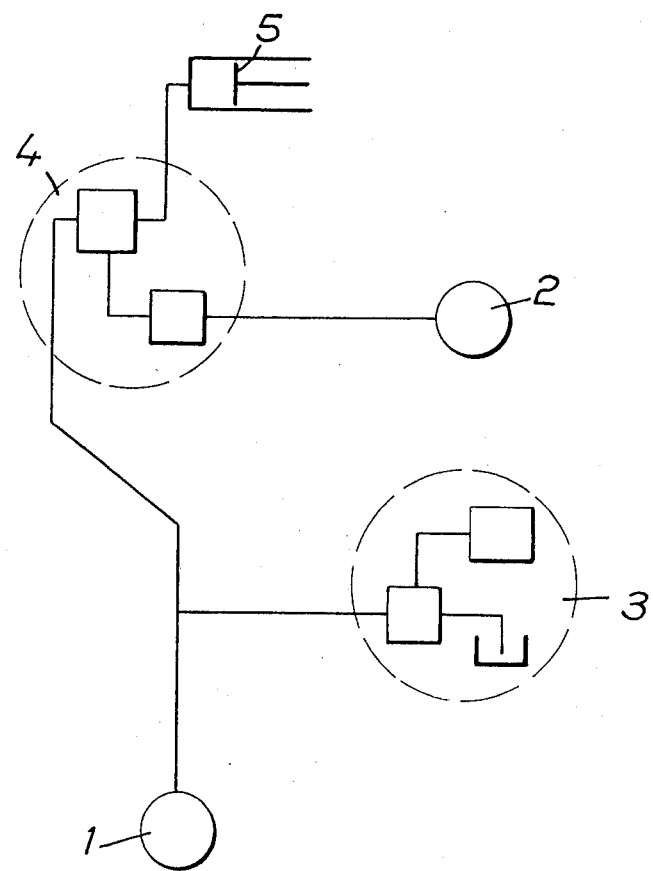

The invention is illustrated in a non-limitative manner by the accompanying drawings; in which:

FIG. 1 shows a simplified general diagram of an injection installation operating according to the process of the invention;

FIGS. 2(a), 2(b), 2(c) and 2(d) show an example of velocity displacement and pressure/displacement curves obtainable according to the process of the invention;

FIG. 3 represents diagrammatically a circuit for carrying out the invention using volumetric pumps;

FIGS. 4(a), 4(b), 5(a) and 5(b) represent moulding programmes which can be realised by carrying out the process of the invention.

FIG. 1 shows the general layout of an injection moulding assembly. The movable part of the mould is indicated at 1. The fixed part of the mould is shown at 2. The reference 3 indicates the injection system for the plastics material controlled by a piston 4. 5 indicates numerically the velocity of closure and of opening of the movable part 1 of the mould. 6 indicates numerically the velocity of displacement of the piston which controls injection of the plastics material. 7 and 8 indicate pump systems, control of which due to the liquid which they deliver causes displacements of the movable part of the mould on the one hand and of the injection piston on the other.

According to a preferred embodiment, two pumps of variable output, separately supplying the press block and injection circuits, are used. These are piston pumps which can be modified as regards their stroke and cylinder output size. For a given adjustment, these pumps furnish a constant output, irrespective of the return pressure, but it is possible to modify the output substantially instantaneously from zero to the maximum. Regulation of the velocities of displacement of the mould and of the injection piston is effected by direct control of the pump output, that is to say, on the servo-valve which controls its position. It is only due to such pumps that loss of energy can be totally eliminated.

However, the invention is not limited to the use of these pumps. Even with volumetric pumps and this is the essential feature of the invention), the invention provides faithful execution of the closure/opening programmes and injection with an economy of energy, because by eliminating the restrictions, the considerable losses of pressure which they necessarily involve do not arise.

In the case where volumetric pumps are used, the hydraulic circuit is modified. A servo-valve controlled as before regulates the amount of oil admitted into the circuits and thus the velocity of displacement.

FIG. 3 illustrates an arrangement of volumetric pumps which, according to the invention, control displacement of a movable part. A main pump is indicated at 11, an auxiliary pump at 12, a pressure-controlled servo-valve at 13, an output-controlled servo-valve at 14 and, at 15, one of the movable parts displacement of which is to be controlled. Thus, in the case where the invention is carried out using volumetric pumps, each principal pump is associated with two servo-valves. One governs the pressure and the other controls the output. This requires a double velocity/displacement and pressure/displacement programme to be determined. The latter programme, clearly refers to the return pressure of the pump and then to the maximum pressure in the hydraulic circuit, the pressure used on the movable parts being lower than this maximum pressure.

Utilisation of two independent pumps is preferred, particularly in the case of rapid presses. However, in the case of large presses with long slow cycles, appreciable dead times exist which can be made use of for charging accumulators by which it is possible to utilise only a single pump.

When variable output pumps are used, execution of the velocity/displacement programme is faithfully ensured. The pressure/displacement programme which, in parallel, is also imposed is a maximum allowed pressure/displacement programme, that is between the normal pressure sufficient to ensure execution of the velocity/displacement programme and the maximum allowed pressure, a margin (of about 15 percent) is allowed which is sufficiently large for small normal variations about the average figure not to interrupt execution of the programme, but sufficiently exact for any abnormal displacement not to be allowed. For example, if a foreign body in the press causes closure, it will be stopped. Thus no damage or serious accident would result. Also, if an abnormal resistance is encountered, either in the machine (lack of lubrication or obstruction of a circuit) or because of the material, or the filling of the mould, production would be immediately interrupted and no loss of manufacture would result nor even any fall in the quality of the objects produced.

It can be advantageous however, when the displacement to be effected becomes extremely small and very slow, for example during final locking of the press, that is to say when using a controlled increase in pressure at virtually zero displacement, to select the pressure as the effective control factor. It is then sufficient, when the displacement effected attains a suitably selected value, to adjust the variable output pump to a very low but stable output and to substitute the return pressure for the velocity of displacement as the control and regulation factor.

Figure 2:
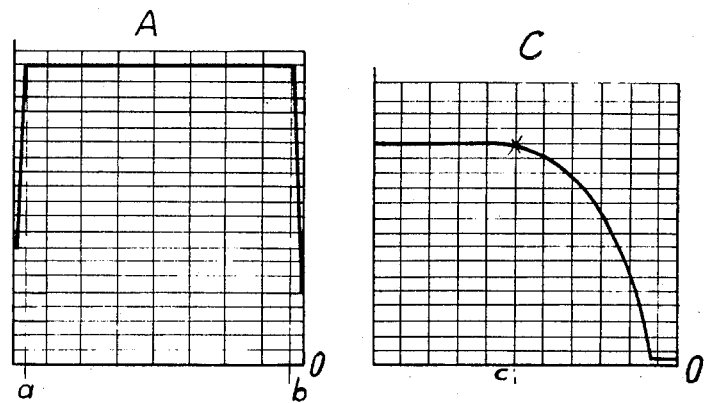
Figure 2:
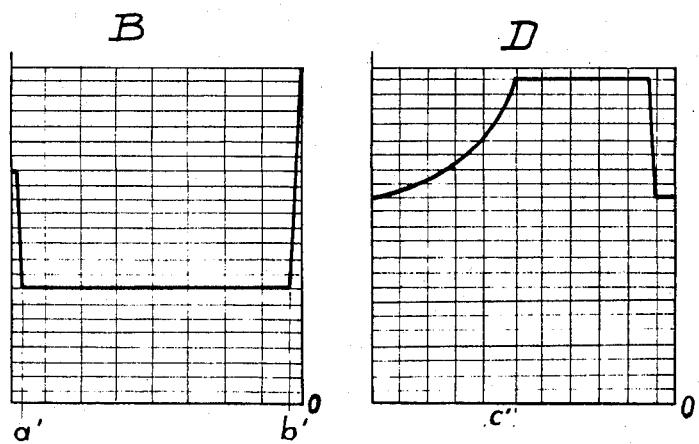

When the pump is of the volumetric type, this substitution is necessary, because it then becomes very difficult to ensure constant output at very small velocities, however high the return pressure is raised. In this case, the servo-valve which governs the output towards the piston is adjusted by the velocity/displacement programme to limit the output to a very low but stable value, though the pressure/displacement programme is established at a selected level which, however, is lower than that which caused execution of the velocity/displacement programme. The surplus output is released by the servo-valve for regulation of the pressure. Due to the device according to the invention already described, it is possible, for example, to carry out the velocity/displacement and pressure/displacement programmes indicated in FIGS. 2(a), 2(b), 2(c) and 2(d) FIGS. 2(a) and 2(b) relate to the control of the movable part of the mould and FIGS. 2(c) and 2(d) to the control of the injection piston. In FIGS. 2(a) and 2(b), between the points $a$ and $b$ of the velocity diagram (or $a'$ and $b'$ of the pressure diagram), control of the displacement of the movable part of the mould is ensured by control of the pump by means of the programme of the velocity of displacement of the mould. Clearly, this programme is only applicable after release of the displacement of the movable part of the mould, which is represented on the drawings by the rapid increase in velocity of the descending part of the pressure curve. In the example chosen, the velocity of displacement of the mould and the pressure supplied by the pump remain constant up to the points $b$ and $b'$, namely during the greater part of the displacement of the mould. It is clear, however, that other programmes of velocity and displacement can be selected, if useful or necessary. When the mould reaches the position corresponding to the points $b$ and $b'$ in the drawing, there is a rapid deceleration of the displacement of the movable part of the mould and this deceleration is itself controlled by suitable programmation of the velocity of the mould and then, when the velocity of displacement of the mould becomes too low, the velocity programmer is automatically put out of action and the last fraction of the displacement of the mould is controlled solely by the pressure (in general approximately the maximum pressure) of the pump. In FIGS. 2($c$) and 2($d$), velocity of injection/displacement and pressure/displacement curves have been shown which relate to control of the displacement of the injection piston. In FIG. 2($c$), it can be seen that, according to the invention, injection is effected at constant velocity almost to the abscissa $c$. At the abscissa $c$ in the example selected, a pressure is attained substantially corresponding to the maximum pressure of the pump, even if later displacements of the piston are no longer controlled by the velocity of displacement of the piston following a predetermined programme, but solely by pressure of the pump. In fact, it is clear that, in accordance with the invention, and because the imposed programme of velocities of displacement of the injection piston is compatible with the pressures which the pump is capable of supplying, it is possible to control the injection by means of a programme of velocity of displacement of the piston during substantially the whole of this displacement. In the conditions at present utilised for injection, it appears that the part of the displacement which it is desirable to control by means of the velocity of displacement of the pump constitutes at least 50 percent and in other instances at least 90 percent, of the total injection cycle.

Precise control of the injection by means of the displacement of the injection piston thus clearly allows a very superior reproducibility for the successive injection cycles. In particular, the point of the cycle represented in FIGS. 2($c$) and 2($d$) by the abscissa points $c$ and $c'$ is reproduced very exactly from one cycle to the next. If small variations in the properties of the material or in the operating parameters of the hydraulic circuits tend to modify the displacement of the piston, the effects of these small variations only modify the injection cycle insofar as it is no longer controlled by the displacement of the piston itself.

One of the major advantages of the invention resides in the very large reproducibility of the operations, both for closure of the mould and for the injection cycle. This regularity derived from various cycles has, a very important consequence, a very considerable improvement in the constancy of the quality of the objects prepared. Also, it is possible to reduce the total cycle time, in comparable conditions, due to a better flexibility of the mould displacement and injection piston programmes. Finally, safety controls are facilitated, both with regard to displacement of the mould and with regard to the injection piston, because in the system according to the invention the programming according to the velocity of displacement is controllable at any moment by the pressures developed by the pumps in the control ducts. When these pressures exceed, for any reason, the range allowed and programmed for a particular cycle type, known devices automatically stop the cycle of the machine.

In order to carry out the invention, it is clear that various technical means at present available can be used. By way of illustration, use can be made of displacement meters which allow measurement of lengths of several centimetres to 0.01 mm. Because of these meters, it is possible to control the displacement of the movable parts throughout all or substantially all of their displacement by restricting to a very small part control solely by means of pressure.

It may also be noted that the principle of programming described in the present application ensures that the moulding cycle takes place according to a succession of stages for one or other of the parameters of velocity or pressure associated with displacement. By multiplying the stages, it can conceivably become possible to approach substantially to an ideal predetermined programme which can be represented by curved lines on the graphs. Technical means known at present allow very numerous stages to be carried out. It is already possible, by means of punched cards, to carry out programmes including for each variable more than 30 successive stages.

It is also possible however, without any fundamental change in the invention, to carry out velocity/displacement and pressure/displacement programmes not by punched cards but by curves traced on X Y coordinates.

An optical photoelectric cell reading head, provided with a device for tracing the curve, can thus control displacement according to X and its displacements along Y are transformed into a proportional electrical signal by any known means (for example, a potentiometer controlled by a piston or lever connected to the reading head). Such mechanisms allow a precision of the order of one-onethousandth and higher in the reproduction of the displacements.

It has thus been found that the device described above which can, if required, be further improved as recently described allows problems to be resolved which arise in carrying out moulding of the "open mould" type and/or the moulding of multi-coloured articles.

It is known to mould by the injection of thermoplastic materials, by partly opening the mould throughout the major portion of the injection, either with the mould incompletely closed or with the closing pressure being too low to contain the thrust of the injected material. This is only possible for certain simple parts, particularly those not having any apertures.

The process has the advantage of considerably facilitating the injection, particularly by decreasing the injection pressures, and thus of final locking of the press and, in consequence, of reducing the loss of energy.

It also has the further advantage of more readily compensating for moulding shrinkage than the standard procedure (with the mould closed) by the technique known as "replenishment," which leads very often to an overreplenishment in the vicinity of the region of injection and to a deficit of replenishment in the peripheral zones, with consequent bad moulding (internal strains, deformations) which thus are brought about.

However, the application of this process to standard presses, using standard control means for the moulding cycles, can lead to practical difficulties due to the instability of regulation and the percentage of defective articles.

The present invention on the contrary allows the maximum profit to be obtained from this moulding method, mainly because it ensures precise control of the injection process and of the quantity injected, and because of the virtually perfect reproducibility of the movements and of their velocities independently of non-controlled variations of external parameters, such as the fluidity of the resin which is, itself, dependent upon the resin or on temperature. Consequently, due to the better control of the operations, it is possible to inject substantially the entire moulding charge into the partly open mould, without the risk of spillage, and so to decrease by a maximum the injection pressure, the time of closure at elevated pressure and thus to reduce the consumption of energy.

With a standard machine provided with known control means, the quantity of the material injected and the velocity of filling of the mould are subject to variations due either to non-constancy of the pressure of the hydraulic fluid or to variations in the viscosity of the plastics material, its temperature, the temperature of the mould or other factors.

Another application of interest is that concerned with the moulding of multi-coloured articles, manufactured by the simultaneous injection of variously coloured materials into two or more parts of the mould, for example on the axis of the fixed platform (and of the fixed half of the mould) and in the plane of the joint between the two parts of the mould.

It can be seen that, in order for the flow interface to be identical for all the articles, it is necessary to control precisely the simultaneity of the injections, as well as their velocities and their volumes. The process of moulding according to the invention adequately fulfils these conditions.

FIGS. 4(a), 4(b), 5(a) and 5(b) of the accompanying drawings show moulding programmes which can be carried out according to the invention. FIGS. 4(a) and 4(b) relate particularly to a moulding programme by control of the velocity of displacement and of the pressure exerted by the movable part of the mould (FIG. 4a) and of the injection piston (FIG. 4b), for preparation of a cup-shaped article corresponding to Example 1. FIGS. 5(a) and 5(b) relate more particularly to a moulding programme by control of the velocity of displacement and of the pressure exerted on the movable part of the mould (FIG. 5a) and on the injection piston (FIG. 5b) for preparation of a container corresponding to Example 2.

In all these figures, the movements of the movable parts have been represented as abscissae (closure of the mould for 4a and 5a or of the injection piston 4b and 5b) and the velocities (V) as ordinates on axes located at the left of the figures and pressures (B) on axes located at the right of the figures. The unbroken lines relate to velocities (V ordinates) and the dotted lines relate to pressures (P ordinates).

In FIGS. 4b and 5b on the right-hand part in chain-dotted lines, the velocities and pressures of mould closure have been shown.

The following examples will illustrate the invention.

EXAMPLE 1

It is desired to mould a thin-walled bowl of a diameter of 154 mm weighing 45 g. The mould has central (pin-point) injection.

Provision is made, in the case of standard moulding with injection into a closed mould, for use of a relatively excessive pressure having regard to its capacity having an elevated closure force, in order to avoid the mould partly opening under the force of the injected material and of not separating or "flashing," that is to say that the material does not enter into the plane of the joint between the two parts of the mould.

For instance, use is made of a Herbert 175 hydraulic press equipped however with a screw-plasticising assembly. The press so modified has the following characteristics;

| | |
|---|---|
| Maximum moulding capacity | 150 g |
| Closing pressure | 175 tons |
| Maximum injection pressure | |
| on the material | 1200 bars |
| or on the injection piston | 140 bars |

High-density polyethylene is employed of grade (I.F.C.) = 5 of volumetric mass $mv_{25°} = 0.960$. The temperature of the injected material is 280°C. The moulding cycle is controlled to 25 seconds with: 1st pressure of injection of the piston = 140 bars 2nd pressure of injection of the piston = 60 bars (end of injection and replenishment).

These conditions are necessary in order for the moulded article to be satisfactory. The same bowl has been moulded (with the same mould, the same plastics material, the same temperature) on a press of lower capacity equipped according to the invention, namely a GM (Germain and Manceaux) hydraulic press of a maximum capacity of 50 g with maximum injection pressure on the material = 1,000 bars, the maximum injection pressure on the piston = 140 bars. Closing force = 50 tons.

Two volumetric pumps connected in parallel but of different outputs supply the hydraulic circuits of the press and of the injection unit. The moulding programme is represented in FIG. 1.

Injection takes place for the major part with the mould partly open (opening of 6 mm). The mould is closed with an elevated closure force which is, however, less than the maximum pressure (only 100 bars at the piston) during the end of the injection.

In this case, the duration of the cycle is only 20 seconds. The moulded articles are very bright and thus have a better appearance than those obtained previously. With a lesser energy output relevant to the number of articles, a considerable increase in the production and quality is obtained. There can be obtained indefinitely, without correction of the regulations, articles of a satisfactory quality, using manufacturing periods which extend over several weeks.

In order to show the stability of the conditions of moulding and the reliability of the process, the H.D. polyethylene was replaced, without changing any of the mould conditions (temperatures, velocities and pressures), by LD grade 3 polyethylene of $mv_{20°} = 0.924$ and then by a polypropylene of grade (I.F.C. 230°–5 kg) = 7 and then by a polyethylene of grade (I.F.C.) = 20 $mv_{20°} = 0.925$ (the grade except for contrary indication being measured at 190° under 2,160 kg according to the Afnor standard T 51016).

Despite the considerable differences in the fluidity and nature of the various resins, regular articles of good appearance have been obtained which are completely satisfactory. In the same press, injection moulding has been carried out with the mould partly opened but without recourse to the process of the invention making bowls with the H.D. polyethylene above.

The standard moulding process has been used which consists of regulating the volume to be injected by overall displacement of the screw and of closing the moulding solely in relation to the maximum velocity and the maximum pressure of injection.

After careful regulation, suitably moulded articles can be obtained without trimming but very quickly, after a few dozen articles, the conditions change and the articles are incomplete or are flashed or are otherwise not satisfactory.

The material has also been changed as previously mentioned. In this case, the material is less fluid and the article is incomplete or on the contrary the material is more fluid and the article is largely flashed.

Finally, it has been possible with this press to mould the bowl by injection according to the standard process in a mould previously closed and locked.

The force of closure is then insufficient and the mould partly opens during the injection and causes flashing.

EXAMPLE 2

On the same GM press equipped according to the invention, a container has been moulded with a circular base, for boxes or sealed containers, of a diameter of 145 mm and weighing 20 g.

It has a peripheral fitted surrounding joint and a reinforced thickness. The material chosen was LD (low density) polyethylene, because of its flexibility.

Figure 5:
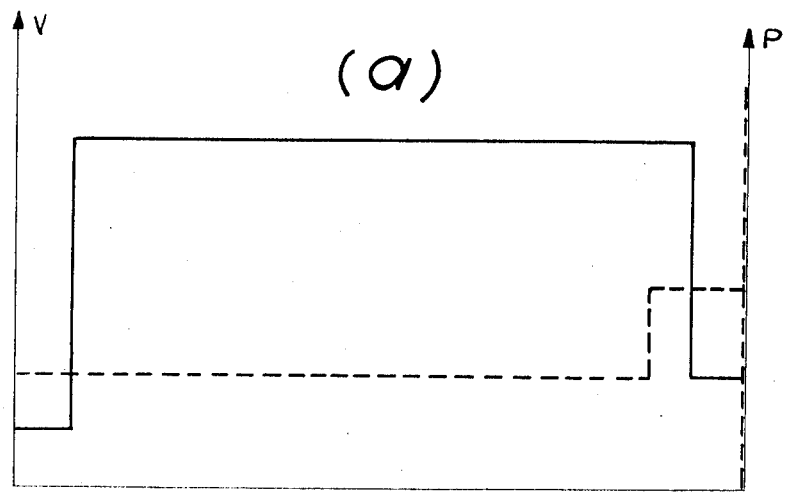
Figure 5:
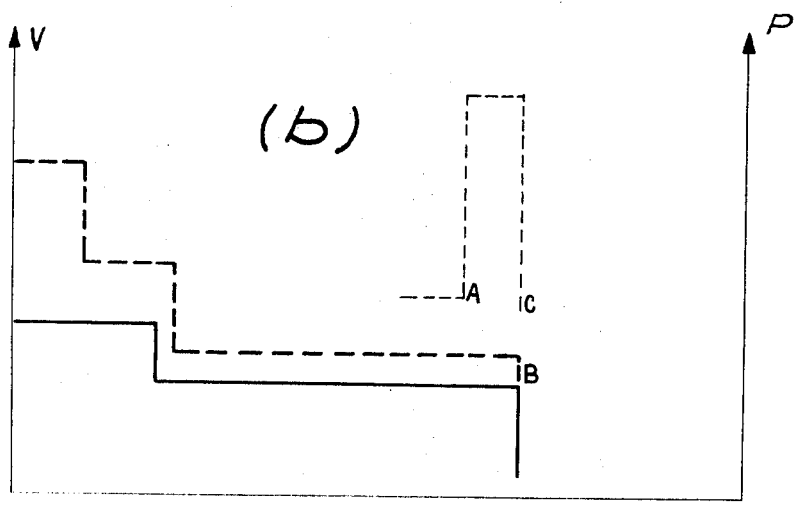

The moulding conditions are represented in FIG. 5.

The mould was closed but not completely locked. It opened slightly during the course of the injection.

It was locked towards the end of the injection at point A, FIG. 5.

The closing pressure was taken to a lower value (C) than the injection pressure which was itself reduced (B), that is to say during the replenishment period, see FIG. 5. The temperature of the injected material was 240°C.

In the conditions indicated, articles of good appearance which are quite flat and well-shaped have been obtained with one or other of the resins without modification of moulding conditions. The duration of the cycle was only 16 seconds.

As in Example 1, it has not been possible to mould the same article according to the standard method, using a mould which has been locked on the same GM press, as the closure force is not sufficient. On a more powerful press, for example the Herbert 175 of Example 1, it is possible to mould under these conditions but the articles have a less brilliant surface appearance, show concentric rings and are mis-shapen.

It has not previously been possible to mould under the conditions of Example 2 without utilising the process of the invention, that is to say, to mould according to the standard process but with a closed, unlocked mould. In this case, a regulation cannot be maintained for a long time without correction and the percentage of articles to be rejected because of incompleteness or flashing is considerable.

I claim:

1. An injection moulding machine for injection moulding plastic material and the like, said moulding machine comprising a fixed mould portion, a cooperating movable mould member, a movable piston-operated injection system for injecting moulding material into said mould, a hydraulic system including a variable output pump and adapted to move said movable mould member, means for continuously monitoring the actual velocity of displacement of said movable mould member, means for continuously comparing the monitored velocity of displacement of said movable mould member with a predetermined velocity displacement program for the movable mould member, and means for adjusting the velocity of displacement of the movable mould member to maintain said actual velocity thereof at a value substantially equal to said predetermined velocity of displacement thereof, said movable mould member displacement velocity adjusting means including a servo-valve for controlling the output of said pump, a second hydraulic system including a second variable output pump and adapted to move said movable piston, means for continuously monitoring the actual velocity of displacement of said movable piston, means for continuously comparing the monitored velocity of displacement of said movable piston with a predetermined velocity displacement program for the movable piston, and means for adjusting the velocity of displacement of the movable piston to maintain its actual velocity at a value substantially equal to said predetermined velocity of displacement thereof, said movable piston displacement velocity adjusting means including a second servo-valve for controlling the output of said second pump.

* * * * *